United States Patent [19]
Hall

[11] 4,188,784
[45] Feb. 19, 1980

[54] ARTICULATED EXHAUST SYSTEM

[75] Inventor: John F. Hall, Bloomfield Hills, Mich.

[73] Assignee: Chrysler Corporation, Highland Park, Mich.

[21] Appl. No.: 857,488

[22] Filed: Dec. 5, 1977

Related U.S. Application Data

[63] Continuation of Ser. No. 735,462, Oct. 26, 1976, abandoned.

[51] Int. Cl.$^2$ .............................................. F01N 7/10
[52] U.S. Cl. ..................................... 60/323; 285/268
[58] Field of Search ...................... 60/313, 323, 322; 285/223, 268, 279, 131, 136, 137 R, 184, 275

[56] References Cited
U.S. PATENT DOCUMENTS

| | | | |
|---|---|---|---|
| 967,294 | 8/1910 | Aldrich | 285/268 |
| 1,733,457 | 10/1929 | Hannahs | 285/268 |
| 4,050,245 | 9/1977 | Little | 60/313 |

FOREIGN PATENT DOCUMENTS 835820  4/1952  Fed. Rep. of Germany .......... 285/268

Primary Examiner—Douglas Hart
Attorney, Agent, or Firm—Baldwin & Newtson

[57] ABSTRACT

The exhaust manifold for a transversely mounted automobile engine terminates adjacent to the engine in an outlet having an articulated connection with the inlet of an exhaust header that terminates in an exhaust pipe discharging to the atmosphere.

The articulated connection comprises an annular coupling portion having a spherical surface at the header inlet removably interfitting within a downstream enlarging conical sealing surface at the manifold outlet. An annular flange adjacent to the inlet of the header may be seated in sealing engagement against a second sealing surface of the annular coupling portion. A collar is yieldingly urged against the annular flange by spring means removably secured to the header to enable replacement of the annular coupling portion and to maintain the latter during operation in sealing engagement with the conical sealing surface.

13 Claims, 8 Drawing Figures

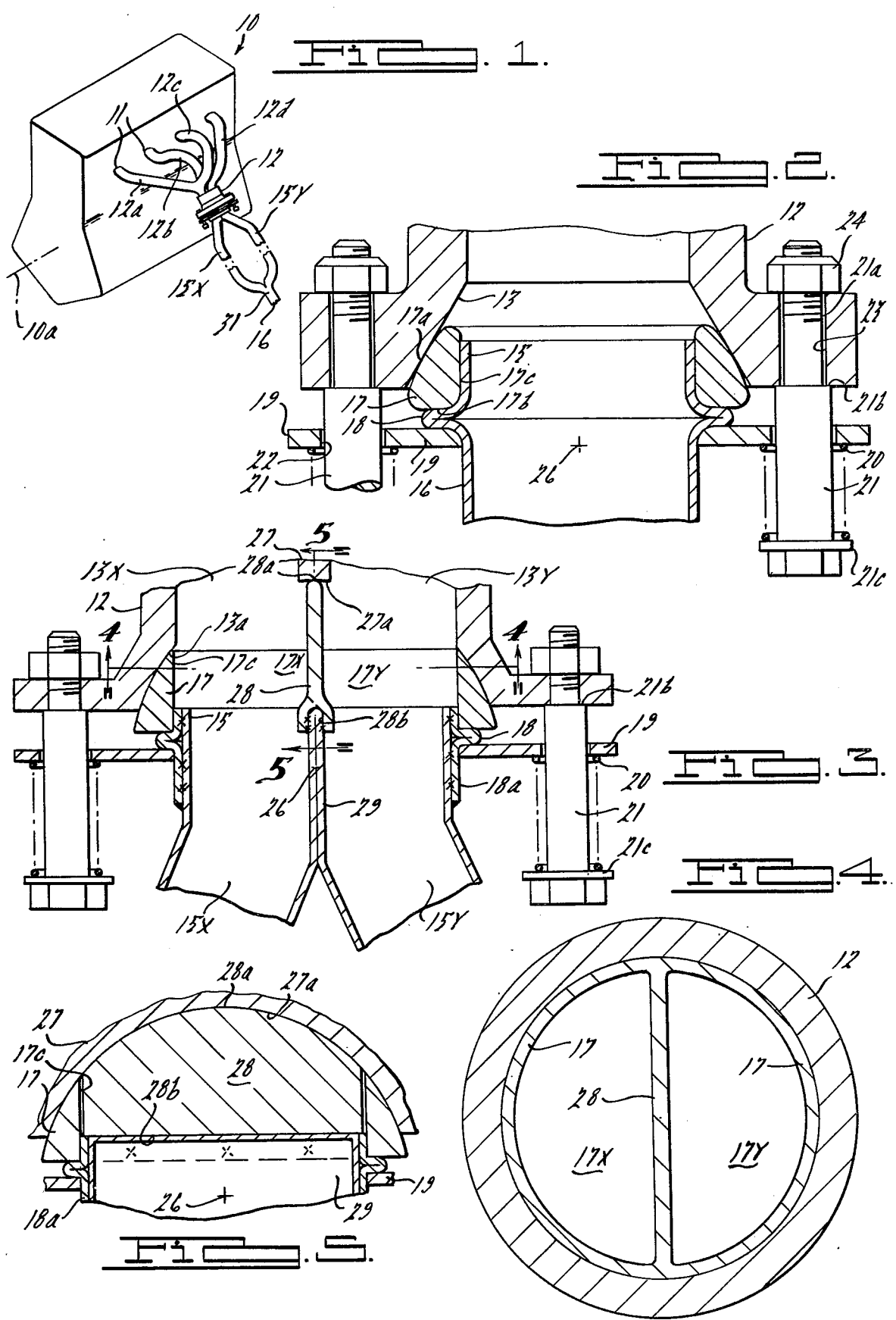

4,188,784

ARTICULATED EXHAUST SYSTEM

BACKGROUND AND OBJECTS OF THE INVENTION

This application is a continuation of copending application Ser. No. 735,462, filed Oct. 26, 1976 now abandoned.

It is concerned with exhaust systems for automobiles and is illustrated by way of example with a sub-compact vehicle wherein for optimum compactness the engine is mounted with its roll axis transverse to the longitudinal front-to-rear axis of the vehicle. It will be apparent that the invention may be readily employed in other applications.

Difficulty is encountered at times in maintaining a conventional rigid connection between the exhaust manifold of the engine and the customary rearwardly extending exhaust header or tailpipe. Various articulated connections have been proposed heretofore, but such connections have been subject to excessive wear and leakage after a short period of use.

An object of this invention is to provide an improved comparatively leak proof articulated connection between the exhaust manifold and header or tailpipe that utilizes a sealing annulus in sealing engagement with annular seats around the manifold outlet and header inlet and is characterized by durability, efficiency, and simplicity and economy of construction, replacement and operations.

Another object is to provide such a seal wherein the annulus is provided with a spherical sealing surface in sealing engagement with a downstream enlarging conical sealing surface defining the manifold outlet, and wherein the inlet end of the header removaly telescopes into the annulus and is provided with an annular radially extending sealing flange that seats against an annular sealing surface of the annulus transverse to the latter's major axis, and wherein a collar is yieldingly clamped against the annular flange of the inlet end of the header by removable spring means.

Other objects of this invention will appear in the following description and appended claims, reference being had to the accompanying drawings forming a part of this specification wherein like reference characters designated corresponding parts in the several views.

FIG. 1 is a diagrammatic view showing a 4-cylinder automobile engine mounted with its roll axis transverse to the longitudinal or fore and aft axis of the vehicle.

FIG. 2 is an enlarged axial section showing details of the articulated connection between the exhaust manifold and exhaust header.

FIG. 3 is a view similar to FIG. 2, illustrating a modification of the invention adopted for engine tuning.

FIG. 4 is a transverse sectional view taken in the direction of the arrows substantially along the line 4—4 of FIG. 3.

FIG. 5 is a sectional view taken in the direction of the arrows substantially along the line 5—5 of FIG. 3.

Figure 6:
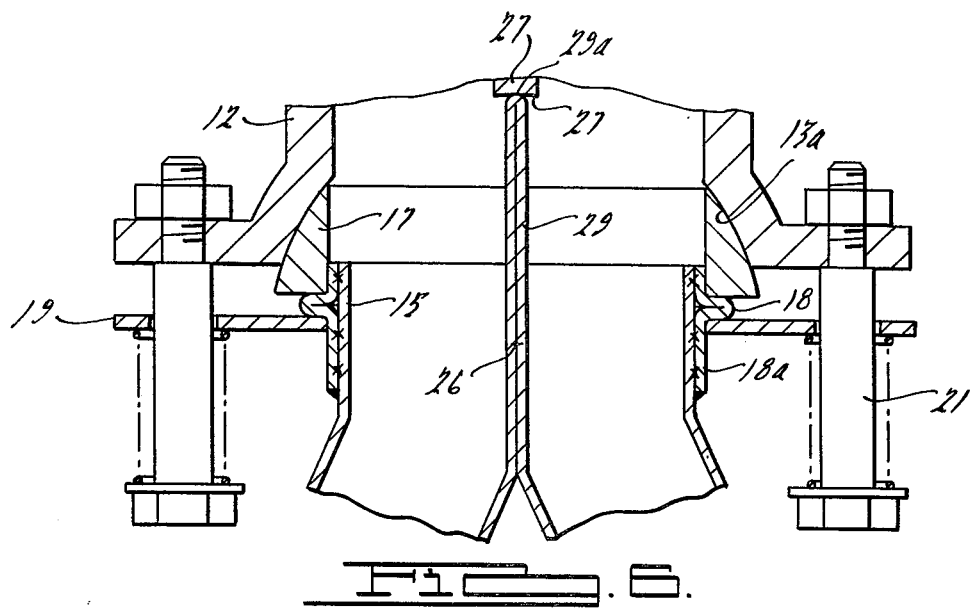
FIGS. 6 and 7 are views similar to FIGS. 3 and 2 respectively, showing modifications.

It is to be understood that that invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

FIG. 1 illustrates the present invention adapted for use with 4-cylinder engine 10 mounted transversely with respect to the front to rear axis of an automobile, where provision may be made for exhaust tuning. It will be apparent that the invention is not limited to a piston-cylinder type engine and has application with any pulsating engine having multiple exhaust ports. The engine 10 may be conventional and in the present instance has four exhaust ports 11 discharging respectively into four short manifold conduits 12a, 12b, 12c and 12d of an exhaust manifold 12 having an outlet 13, FIG. 2. The four conduits 12a–12d merge at the outlet 13, which is suitably connected by means of an articulated coupling with the inlet 15 of an exhaust header 16.

The outlet 13 is defined by annular conical sealing surface diverging in the downstream direction with respect to the exhaust gas flow. A sealing annulus 17 has a spherical sealing surface 17a seated in sealing relationship at the conical surface 13 and also has an annular transverse sealing surface 17b seated in sealing relationship against the proximate sealing surface of an annular movement limiting and sealing flange 18 of the header 16 adjacent its inlet end 15. The flange 18 extends radially outwardly from the header 16 transversely to the latter's major axis. The interior surface 17c of the annulus 17 is cylindrical and coaxial with the axis of header 16, which axis is perpendicular to the plane of the confronting sealing surfaces 17b and flange 18 and also to the roll axis of the engine 10. The surface 17c fits coaxially and snugly around the cylindrical header inlet end 15.

A clamping collar 19 is yieldingly urged against the side of flange 18 opposite the end 15 by means of a pair of diametrically arranged springs 20 which are held in clamping position by shoulder bolts 21. Each of the bolts 21 extends through a bolt hole 22 in the collar 19, has a screw threaded end 21a of reduced diameter that extends through a hole 23 in the manifold 12 and is secured in position by a nut 24, and has an annular shoulder 21b that seats against the manifold 12. A flange or enlargement 21c provides a spring retainer for the spring 20 to urge the latter against the collar 19.

By the construction described, the shoulder 21b effects a predetermined spacing between the flange 21c and manifold 12 and accordingly maintains a predetermined spring induced compressional force clamping the collar 19 against the flange 18, thereby to clamp the sealing surfaces 17a and 17b between the conical sealing surface 13 and upper transverse surface of the flange 18 respectively to maintain a sealing relationship therebetween. The major axes of the springs 20 at their regions of contact with collar 19 intersect a line parallel to the roll axis 10a of the engine 10 and through the center of curvature 26 of the spherical surface 17a. Thus during rolling motion of the engine 10 about its roll axis 10a, the primary relative movement of the clamped together header 16, annulus 17, and collar 19, with respect to the manifold 12, takes place between the conical surface 13 and spherical surface 17a about a pivot axis comprising the latter line through the center 26, so that flexing and alternate compressing and tensioning of the springs 20 and their consequent failure is reduced to a minimum.

The exhaust header 16 extends rearwardly for several feet, usually through a muffler which is suspended from the undercarriage of the vehicle. Accordingly the inlet end 15 of the header 16 may freely move up and down during the aforesaid rolling of the engine 10 without rupturing the connection or mounting of the header 16 with the vehicle body at or near the muffler. Pitching of the engine 10 about a pitch axis transverse to the roll axis is usually nominal in comparison to the rolling action. Thus the rearwardly extending header 16 has adequate resiliency or flexibility to accommodate such movement without recourse to an articulated junction, such as the spherical surface 17a seated at the conical surface 13. Accordingly instead of the spherical surface 17a illustrated, a cylindrical surface about an axis through 26 and parallel to the roll axis 10a is adequate. The comparatively inconsequential engine pitch is then readily accommodated by torsion in the header 16. The springs 20 are seldom compressed or elongated during such movement. The spherical surface 17a and conical surface 13 are preferred because of the ease with which these surfaces may be fabricated, although the sealing surface 13 can also be spherical.

The manifold 12 may comprise a steel casting and the header 16 may comprise tubular steel stock, whereas the annulus 17 may comprise a softer material such as a sintered powdered metal, graphite impregnated woven steel mesh, or other suitable sealing material capable of withstanding the high exhaust temperature. As the annulus 17 wears with use, the springs 20 maintain the sealing engagement between the sealing surfaces to effect a gas tight seal which in most instances will last for the life of the vehicle without replacement.

FIGS. 3-5 illustrate a modification of the invention adapted for exhaust tuning a four cylinder engine. Instead of the conical sealing surface 13 of FIG. 2, a spherical surface 13a concentric with surface 17a is preferred for the outlet of manifold 12. The outlet 13a and header inlet 15 may be partitioned into a number of separate passages, each connected with selected exhaust ports of the engine 10 to enable exhaust tuning in accordance with conventional practice, depending upon the desired extent and refinement of the tuning. For optimum tuning with a 4-cylinder engine having the four exhaust ports 11, the manifold outlet 13a and header inlet 15 may each be partitioned into four separate exhaust passages, each connected with one of each of the four exhaust ports associated with the conduits 12a-d. In a simplified and less costly system, the outlet 13a and inlet 15 may be partitioned into two passages, each connected with two of the four exhaust ports 12a-d associated with non-consecutively firing cylinders. In other respects, the manifold outlet 13a and annulus 17 cooperate with the flange 18, collar 19, springs 20, and bolts 21 as described above. To simplify fabrication, the flange 18 is crimped from a tubular sleeve portion 18a which fits closely around the inlet 15 and is welded thereto, instead of being crimped from the latter as in FIG. 1.

In FIGS. 3-5, the manifold outlet 13a is partitioned diametrically into two openings or passages 13x and 13y by septums 27 and 28 integral respectively with manifold 12 and inlet 15. Each opening 13x for 13y is in communication with selected exhaust ports of the engine 10. In this situation, each of the two manifold openings is in communication with two engine cylinders that do not fire consecutively. For example, if the cylinders are numbered 1, 2, 3, and 4 according to their firing order, cylinders 1 and 3 will be connected via two of the short manifold conduits 12a and 12c with the manifold opening 13x, and cylinders 2 and 4 will be similarly connected via conduits 12b and 12d with the other manifold opening 13y.

The septum 28 also partitions the annulus 17 diametrically into two passages 17x and 17y in communication respectively with the two outlets 13x and 13y. The diametrical opposite edges of the septum 28 fit closely within the cylindrical surface 17c, FIG. 5, but with a small clearance to accommodate differential thermal expansion between the materials of the annulus 17 and septum 28, which latter may be a steel stamping. In the latter regard, it is important that the septum 28 and annulus 17 are separate and slightly spaced members because the exhaust gas heat is not as readily dissipated from the central septum 28 as from the annulus 17. When the latter members are formed integrally from the same material, the resulting thermal expansion of the hotter septum 28 tends to wrap or crack the cooler annulus 17.

The septums 27 and 28 extend transversely to the roll axis 10a and are provided with confronting and closely interfitting spherical surfaces 27a and 28a respectively centered at 26, thereby to effect a gas seal therebetween while enabling the engine 10 to pitch or roll. Also in FIG. 3, the upper or leading edge surface 28a may be comparatively sharp or pointed in the sectional view to effect a surface 28a that wears rapidly against the spherical surface 27a during operation. The septum 28 may thus be dimensioned to effect an initial high friction seal between the surfaces 27a and 28a. After a short wearing-in period, the leading edge 28a wears sufficiently to provide an effective low friction gas seal with the surface 27a.

The downstream edge of the septum 28 is provided with a notch 28b to receive a closely interfitting septum 29 integral with septum 28, as for example by being welded thereto. The septum 29 partitions the header inlet 15 into two separate passages 15x and 15y in communication with the passages 17x,13x and 17y,13y respectively. The passages 15x and 15y merge into header 16 at a predetermined downstream location 31, FIG. 1. The header 16 continues thereafter to the customary muffler and exhaust tailpipe. The length of the passages 15x and 15y is determined by the tuning characteristic desired. For optimum exhaust tuning at high speed operation, the conduits 15x and 15y will be comparatively short, whereas for optimum exhaust tuning at slower speeds, these conduits will be somewhat longer.

The header inlet 15 may be formed from two separate pipes, each formed to provide a half round passage similar in cross section to the half round passages 17x and 17y illustrated in FIG. 4 and welded together at their flattened diametrical portions to provide the septum 29, or it may be formed from a single piece of pipe that is cut transversely of its axis along approximately half of its circumference, then bent back on itself to open the cut and effect the side-by-side passages 15x and 15y, FIG. 3, which passages are also formed to half round shapes in section similar to the passages 17x and 17y in FIG. 4, wherein the uncut circumferential portion of the original pipe comprises the leading edge of the septum 29.

FIG. 6 illustrates a construction similar to FIG. 3 except that the septum 28 as a separate sheet metal stamping is eliminated. In its place, the septum 29 is extended to a generally spherical upstream edge 29a in concentric sealing engagement with the spherical surface 27a. In all other respects the structure and operation of the FIG. 6 modification is the same as described in regard to FIG. 3.

Figure 7:
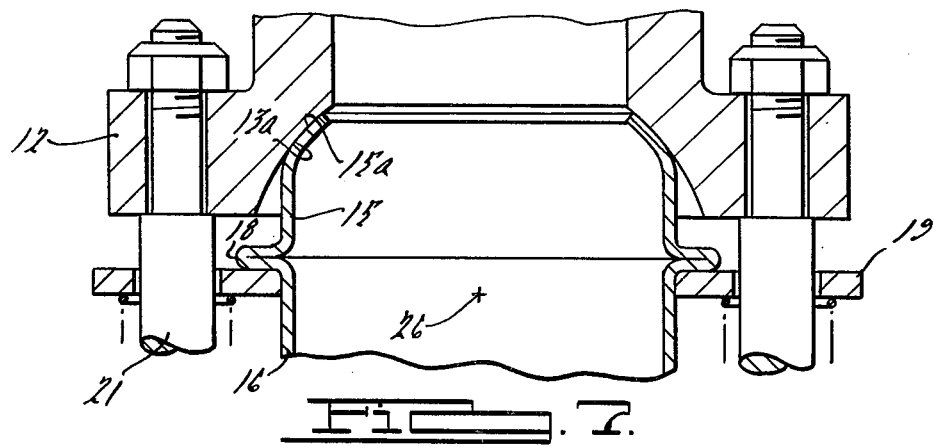

FIG. 7 is a view similar to FIG. 2 except that the conical sealing surface 13 is replaced by the spherical surface 13a centered at 26. Also the sealing annulus 17 is eliminated and replaced by an inturned rounded annular end 15a of the inlet 15, which may be also formed spherically about the center 26 at its areas of contact with 13a, although in this case the spherical seal is not essential for operation. In all other respects, the structure and operation in FIG. 7 is the same as described in regard to FIG. 2.

Figure 8:
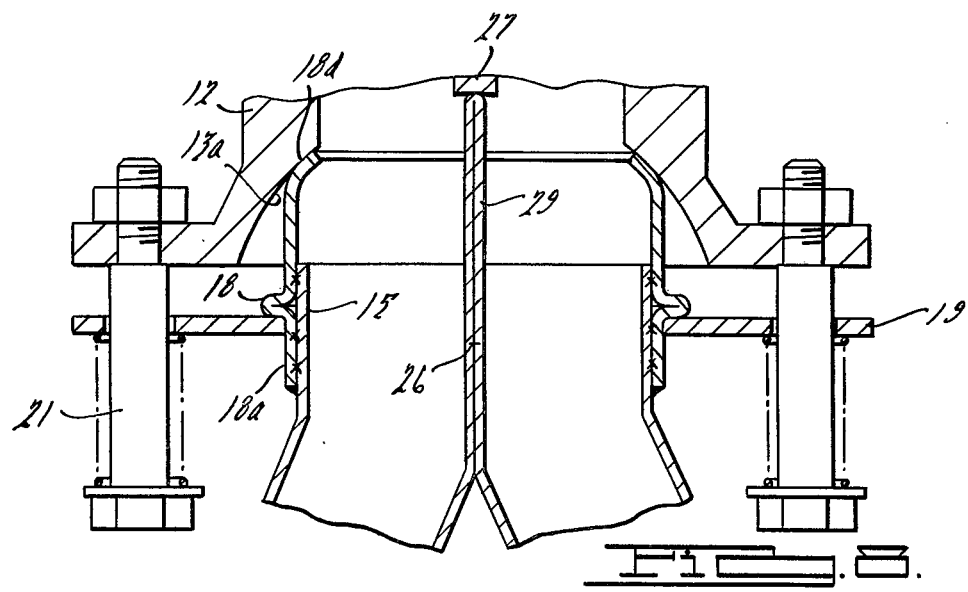
FIG. 8 is a view similar to FIG. 6, showing another modification.

FIG. 8 illustrates a spherical sealing surface 18d similar in all respects to sealing surface 15a of FIG. 7 but formed on an extension of the sleeve 18a and employed with the partitions 27 and 29 of FIG. 6. In all respects, the structure and operation of the parts are the same as the correspondingly numbered parts described above.

I claim:

1. In an exhaust system for a transversely mounted automobile engine having a transversely extending roll axis which results in predominant movements of the parts attached to the engine in planes substantially normal to the roll axis; an exhaust gas passage comprising an exhaust manifold with an outlet portion thereof attached to the engine for conducting exhaust gases from the engine and also an exhaust header with an inlet portion for conducting exhaust gases from the manifold to atmospheres; means forming an articulated connection between the outlet portion of the manifold and the inlet portion of the header including two annular coupling portions of the gas passage associated respectively with the members comprising the manifold outlet portion and the header inlet portion and having seal surfaces removably interfitting one within the other in mutual sliding and sealing engagement around the gas passage; the coupling portions being carried by the members respectively for movement therewith and with one coupling portion being in the form of a distinct annularly shaped seal member extending around one of the members; means around the one member for preventing axial movement of the seal member in one direction away from the other coupling portion and having outwardly extending portions; means for urging the members and coupling portions together to effect sealing engagement therebetween including a pair of springs, each being diametrically positioned with respect to the axis of the members and together lying in a plane which extends substantially normal to the aforedescribed plane of predominant movement; the springs being secured between the members so as to yieldably urge the members axially toward one another to form a sealing contact between the coupling portions.

2. In an exhaust system for a transversely mounted automobile engine having a transversely extending roll axis which results in predominant movements of the parts attached to the engine in planes substantially normal to the roll axis; an exhaust gas passage comprising an exhaust manifold with an outlet portion attached to the engine for conducting exhaust gases from the engine and also an exhaust header with an inlet portion for conducting exhaust gases from the manifold to atmosphere; means forming an articulated connection between the outlet portion of the manifold and the inlet portion of the header including two annular coupling portions of the gas passages associated respectively with the members comprising the manifold outlet portion and the header inlet portion and having primary seal surfaces removably interfitting one another in mutual sliding and sealing engagement around the gas passage; the coupling portions being carried by the members respectively for movement therewith and with one of the coupling portions being in the form of a distinct annularly shaped seal member having a central bore therethrough so as to receive the end portion of one of the members; the seal member also having a secondary seal surface extending normal to the axis of the one member; means around the one member engaging the secondary sealing surface to prevent leakage thereby and to block axial movements of the seal member in a direction away from the other coupling portion; yieldable means urging the members and coupling portions together thereby engaging the primary seal surfaces and including a pair of elongated coil-type springs together being diametrically positioned with respect to the axis of the members and lying on a plane which extends substantially normal to the aforedescribed planes of predominant movement; the springs being secured between the members so as to yieldably urge the members axially toward one another to form a sealing contact between the primary seal surfaces.

3. A vehicle engine and exhaust system including means for mounting the engine transversely in the vehicle with the engine roll axis also extending transversely; an exhaust gas passage between the vehicle engine and atmosphere including an exhaust manifold attached to the engine with an outlet portion therewith forming an elongated and rigid assembly which moves predominantly in a plane normal to the roll axis; the exhaust gas passage further including an exhaust header with an inlet portion; articulated connection means between the members comprising the outlet and inlet portions including two annular coupling portions having seal surfaces interfitting one another in mutual sliding and sealing end engagement about the gas passage, one of the coupling portions taking the form of distinct annularly shaped seal member having a central bore therethrough receiving the end portion of one of the members; the seal member further having a secondary seal surface extending normal to the axis of the one member; means engaging the secondary sealing surface to prevent leakage thereby and to block movements of the seal member in an axial direction away from the other coupling portion; means yieldably urging the members and coupling portions together and including a pair of elongated coil-type spring diametrically positioned with respect to the axis of the members and together forming a plane which extends substantially normal to the plane of predominant movement; the springs being secured so as to urge the members in axial directions to engage the coupling portions whereby the interfitting sealing surfaces of the coupling portion are engaged to permit relative angular displacements between the members accomplished with a minimum of spring flexure.

4. An exhaust system for a transversely mounted automobile engine having portions attached to the engine for predominant movement in a plane normal to the engine's transverse roll axis including members comprising an exhaust manifold with an outlet portion to receive exhaust gases from the engine and an exhaust header with an inlet portion for conducting exhaust gases to atmosphere, at least one of the portions being in the form of a relatively thin walled tubular member with an outwardly directed extension located proximate its end, an annularly shaped seal member with a central opening formed therethrough to receive the end portion of the one portion, the seal having a first seal surface and a second seal surface, the latter extending substantially normal to the axis of the one portion and engaging the radially outwardly directed extension to prevent leakage thereby and to limit axial movements of the seal with respect to the one portion in a direction toward the other portion, the other portion having an end sealing surface adapted to engage the first sealing surface of the seal member, means for yieldingly connecting the portions including a pair of elongated coil-type springs to urge the portions together and to engage the end seal surface of the other portion with the first seal surface of the seal member, the pair of springs being diametrically located with respect to the axis of the portions and lying in a plane normal to the predominant plane in which engine attached exhaust portions are displaced whereby flexing of the spring caused by relative pivoting of the portions is reduced to a minimum.

5. In an exhaust system for an automobile engine, an exhaust manifold having an outlet and defining a portion of a gas passage for conducting exhaust gases from the engine, an exhaust header having an inlet and defining another portion of the gas passage for conducting exhaust gas from the manifold to the atmosphere, means for effecting an articulated connection between the manifold outlet and header inlet comprising; a pair of annular coupling portions in communication with the members which comprise the manifold and header respectively and having sealing surfaces therebetween in mutual sliding engagement, the coupling portion being associated with and carried by the members comprising the manifold and header respectively for movement therewith to effect the engagement, flange means associated with one of the members and engageable therewith for moving the one member and its associated coupling portion in one predetermined direction into the engagement with the other member and its associated coupling portion, elongated spring means with first and second end portions for yieldably urging the coupling portions into sealing engagement, the first end of the spring means being spaced a constant distance from the other member, the sealing surface of one of the pair of coupling portions being spherical about a point substantially coincident with a line running parallel to the roll axis of the engine, and the second end of the spring means urging the flange means in the one predetermined direction and engaging a surface of the flange means substantially along the line running parallel to the roll axis of the engine with the surface lying in a plane including the line running parallel to the roll axis of the engine, whereas when the engine moves about its roll axis, the angular relation between the one member and its associated coupling portion and the flange means is changed with respect to the other member and its associated coupling portion substantially about the line running parallel to the engine roll axis which movement is affected in a sealing manner by the sliding engagement between the coupling portions and is accompanied by only slight changes in the dimension of the elongated spring means between the first and second ends due to the particular engagement of the second end of the spring means with the surface of the flange means described hereinbefore.

6. In the combination according to claim 5, said flange means including a collar member extending about the header member and a radially offset portion of the header member which is axially positioned therealong so that the surface of the flange means as defined by the collar member is on the line running parallel to the engine roll axis.

7. In the combination according to claim 5, the sealing surface of one of said coupling portions comprising an annular interior surface at the outlet of said manifold and enlarging radially in a downstream direction of the exhaust gas flow, the annular enlarging surface comprising an integral outlet of said manifold.

8. In the combination according to claim 7, the annulus comprising one of said coupling portions which forms the other of the sealing surfaces which surface has a spherical contour for engagement with the annular enlarging sealing surface of the manifold.

9. In the combination according to claim 6, the sealing surface of one of said coupling portions comprising an annular interior surface at the outlet of the manifold and enlarging in the downstream direction of exhaust gas flow, the annular enlarging sealing surface comprising an integral outlet of said manifold, the annulus comprising one of the annular coupling portions and having a sealing surface with a spherical contour, said annulus also having a transverse annular sealing surface about said header extending transverse to the major axis of the annulus, the radially offset portion of the flange means having a second surface thereof in sealing engagement with said transverse sealing surface whereby sealing contact is established by the engagement between the second end of the elongated spring means with the surface of the flange means on the line running parallel to the engine roll axis.

10. The combination according to claim 5, the flange means comprising a radially offset portion of a length of pipe sleeved over the end of the header at its upstream end and secured thereto, the flange means also comprising a collar member extending about the length of pipe and engaging the offset portion thereof to axially position the collar so that the one surface of the flange means engages the springs second end on the line running parallel to the engine roll axis.

11. In the combination according to claim 5, the sealing annulus having a cylindrical inner bore adapted to encircle the header, the sealing surface of one of said coupling portions comprising an annular interior surface at the outlet of the manifold and enlarging in the downstream direction of exhaust gas flow, the annular enlarging sealing surface comprising an integral outlet of said manifold, the annulus comprising one of the coupling portions and having a sealing surface with a spherical contour, said annulus also having a transverse annular sealing surface about said header extending transverse to the major axis of the annulus, the radially offset portion of the flange means having a second surface thereof in sealing engagement with said transverse sealing surface whereby sealing contact is established by the engagement between the second end of the elongated spring means with the surface of the flange means on the line running parallel to the engine roll axis.

12. The combination according to claim 10, the radially offset portion having a sealing surface extending a plane transverse to the major axis of said annulus and being clamped by said collar against said transverse sealing surface of said annulus for relative movement as a unit therewith upon pivoting of said manifold about the center of said spherical surface.

13. The combination according to claim 12, the annulus member having a transverse annular sealing surface about said header extending transversely to the major axis of the annulus, the radially offset portion of the header providing a sealing surface with the transverse sealing surface of the annulus engaging in a plane transverse to the major axis of the annulus and the header and being clamped together for relative movement therewith as the manifold member pivots about the center of said spherical surface.

* * * * *